United States Patent

[11] 3,626,976

| [72] | Inventor | Hillebrand Johannes Josephus Kraakman Emmasingel, Eindhoven, Netherlands |
|---|---|---|
| [21] | Appl. No. | 856,645 |
| [22] | Filed | Sept. 10, 1969 |
| [45] | Patented | Dec. 14, 1971 |
| [73] | Assignee | U.S. Philips Corporation New York, N.Y. |
| [32] | Priority | Sept. 18, 1968 |
| [33] | | Netherlands |
| [31] | | 6813310 |

[54] PRESSURE TIME DELAY DEVICE
2 Claims, 1 Drawing Fig.

[52] U.S. Cl. .................................... 137/508,
137/509, 137/514.7
[51] Int. Cl. .................................... F16k 21/10
[50] Field of Search .......................... 137/504,
508, 509, 514.7

[56] References Cited
UNITED STATES PATENTS
2,198,487  4/1940  Sisk .............................. 137/504

2,541,464  2/1951  Davies ........................... 137/504 X
3,444,885  5/1969  Sanchez ......................... 137/504
FOREIGN PATENTS
1,242,903  8/1960  France ........................... 137/504
561,402  2/1928  Germany ......................... 137/504

Primary Examiner—W. Cary Nelson
Assistant Examiner—Richard Rothman
Attorney—Frank R. Trifari ABSTRACT: A device for delaying the pressure buildup in a fluid path in which the fluid is used for performing effective work. The device has a cylinder within a housing through which a duct communicates at one end with the path of fluid flow and a valve is arranged at the other end for closing the duct to a communication with an outlet port. When the pressure in the fluid path begins to build up, the fluid acts on the cylinder to move it in an axial direction so as to close the valve. The device also has ducts for communicating with a space surrounding the cylinder and pressure also acts on the cylinder in the opposite direction along with a spring so that the closing of the valve occurs slowly to thereby delay the buildup of pressure in the fluid path.

PATENTED DEC 14 1971　　　　　　　　　　　　3,626,976
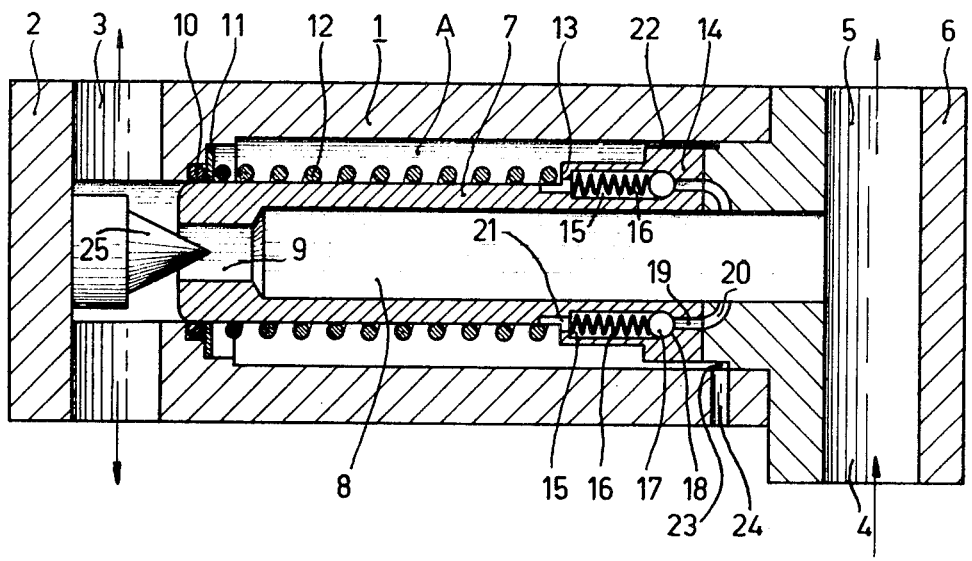
INVENTOR.
HILLEBRAND J.J. KRAAKMAN
BY
AGENT

PRESSURE TIME DELAY DEVICE

The invention relates to a device for delaying the pressure buildup in a fluid medium in a system. The medium in the system is under pressure and intended to perform effective work, the flow of volume of the medium is constant.

It is often necessary upon actuating such a system, to gradually increase the pressure until it reaches the operating level, so as to avoid shock pressures and sudden pulses, which may have unpleasant consequences. This is desirable when high pressures of a few 10's of atmospheres occur. The pressure may be controlled manually, but automatic means for control is desirable so as to avoid errors.

The object of the invention is to provide a device in which the pressure buildup is delayed and takes place automatically. This is achieved by actuating a valve which is under the influence of the difference between the increasing pressure of the medium being supplied and the pressure initially prevailing in the system. The valve closes in a delayed manner when the difference decreases. In the open condition it permits partial flowing away of the supplied medium outside the device. This is accomplished by providing a cylinder housing having a second cylinder axially movable in the housing. The cylinder housing supports one part of the valve, the other part being contained in the second cylinder and, when the two parts are combined (brought together), the passage through the valve for the supplied medium to a port leading outside the system and the device, is closed. The medium supplied to the second cylinder exerts a pressure thereon in one axial direction which tends to open the valve, and a pressure in the opposite direction which tends to close the valve. The pressure in the first direction is counteracted by a spring and the pressure in the opposite direction occurs in a space closed on one side between the two cylinders, in which space the spring is also situated, said space communicating, through a resistance, with a space outside the system and the device.

The space between the cylinders is filled with medium under pressure by providing one or more nonreturn valves. When there are in the open condition there is a free communication between a space in which the pressure of the supplied liquid medium prevails and the space between the cylinders.

In order that the invention may be readily carried into effect, one embodiment thereof will now be described in greater detail, by way of example, with reference to the accompanying drawing which is a cross-sectional view through a device for the delayed supply of a liquid medium under pressure to a system and which constitutes one embodiment of the invention.

Reference numeral 1 in the drawing denotes a cylinder which is closed on one side by a cover 2. On this side two apertures 3 are provided which serve for the outlet of oil to an open space. On the other side two apertures 4 and 5 are provided in a cover 6; through the aperture 4 oil under a high pressure of, for example, 40 atmospheres is supplied; through aperture 5 this oil is supplied to a system where the oil can perform effective work. In the cylinder 1, a second cylinder 7 is provided which is axially movable. Cylinder 7 comprises a duct 8 which on one side has a narrowing 9 and which duct opens into the apertures 4 and 5 which are in alignment. Furthermore a rubber ring 10 is present which is situated in a chamber of the cylinder 1 and serves as a seal for the cylinder 7 in the cylinder 1. A plate 11 encloses the ring 10. A compression spring 12 is situated around the cylinder 7 and in a space A between the cylinder 1 and the cylinder 7; at one end said compression spring 12 engages the plate 11; at the other end it engages the flange 13 of the cylinder 7. A head 14 of the cylinder 7 has some play relative to the cylinder 1, so that a narrow gap 22 is formed between the head 14 and the inner wall of the cylinder 1. This head 14 furthermore comprises two apertures 15 with springs 16 and balls 17 which bear on seatings 18. Ducts 19 communicate apertures 15 with ducts 20 and the cover 6, which latter ducts open into duct 8 which extends within the cover 6. The apertures 15 communicate with the space A between the cylinders 7 and 1 through ducts 21. In the elongation of gap 22 there is a recess 23 in the cover 6, which recess communicates with the outer air through a duct 24. Finally a conical closing member 25 capable of closing the narrowing 9 is present on the cover 2.

When a medium such as oil under pressure of, for example 40 atm., is admitted to duct 4, said pressure propagates in the duct 8 and a part of the flow of medium leaves the duct 8 again and flows through apertures 3 to the outside. This medium also arrives in the ducts 20 and 19, forces the ball 17 to the left and fills the space A. However, this space A has a leak through gap 22. Upon correct choice of the various dimensions and of the surfaces on which the pressure of the medium is operative, as well as of the characteristic of the spring 12, the size of the gap 22, and the shape of the gap between the member 25 and narrowing 9, a pressure buildup both in the duct 8 and in the space A will take place so that the cylinder 7 will slowly move to the left and the cone 25 will close the aperture 9. At the same time the balls 17 close the ducts 19.

In a practical device the medium pressure was 40 atm. and the duration between actuating and fully closing the valve 9–25 was from ½ to 1 min., with which the end in view was fully reached.

The shape of the valve 9–25 and the gap 22 mainly determine the pressure buildup up to the desired level. It is obvious that the gap 22 can also be replaced by another resistance, for example, by one or several ducts in the head 14. The shape of the valve 9–25 may also be different from that shown.

What is claimed is:

1. A device for delaying pressure buildup in a liquid flow used to perform work comprising a cylindrical housing, a diametrically extending conduit at one end of said housing for passing said liquid flow therethrough, an axially movable cylinder body mounted within said housing so that a space remains between the outer wall of said cylinder and the inner wall of said housing, a head formed at one end of said cylinder body having a larger diameter than said cylinder body so that a flanged surface is formed at the transition between said cylinder body and said head, a gap being located between the outer wall of said head and the inner wall of said housing, a duct passing axially through said cylinder body and said head communicating at the end of said head with said conduit, an outlet port in said housing communicating with the duct, a valve at the end of the duct remote from said head for slowly closing the communication to said outlet port when said cylinder is caused to move to the closed position by an increase of pressure acting thereon supplied from the liquid in said conduit, a passage communicating between said duct sand said space so as to pass liquid into said space for acting on said cylinder body, the liquid in said space being allowed to escape through said gap to a release duct, and a spring surrounding said cylinder and occupying said space, one end of said spring engaging said flanged surface so as to urge said cylinder to remain in an open position so that the communication between the duct and the outlet closes slowly thereby delaying the buildup of pressure in the liquid flow through said conduit.

2. The device according to claim 1 further comprising at least one nonreturnable valve for opening the passage between said space and said duct.

* * * * *